US010819103B2

(12) United States Patent
Burra et al.

(10) Patent No.: US 10,819,103 B2
(45) Date of Patent: Oct. 27, 2020

(54) SYSTEMS AND METHODS FOR ISOLATING FAULTS IN ELECTRICAL POWER SYSTEMS CONNECTED TO A POWER GRID

(71) Applicant: General Electric Company, Schenectady, NY (US)

(72) Inventors: Rajni Kant Burra, Clifton Park, NY (US); Randal Voges, Clifton Park, NY (US); Saurabh Shukla, Glenville, NY (US); Govardhan Ganireddy, Salem, VA (US); Baraa Kadhum, Aurora, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/834,360

(22) Filed: Dec. 7, 2017

(65) Prior Publication Data

US 2019/0181632 A1   Jun. 13, 2019

(51) Int. Cl.
*H02H 7/06* (2006.01)
*F03D 17/00* (2016.01)
(Continued)

(52) U.S. Cl.
CPC .............. *H02H 7/06* (2013.01); *F03D 9/257* (2017.02); *F03D 17/00* (2016.05); *H02J 3/386* (2013.01);
(Continued)

(58) Field of Classification Search
CPC . H02H 7/06; H02J 3/386; H02P 9/006; H02P 9/007; F03D 17/00
See application file for complete search history.

(56) References Cited

U.S. PATENT DOCUMENTS 6,858,953 B2   2/2005   Stahlkopf
7,432,686 B2   10/2008  Erdman et al.
(Continued)

FOREIGN PATENT DOCUMENTS

WO   WO2009083446 A2   7/2009

OTHER PUBLICATIONS

Kirakosyan et al., "Fault Ride Through and Grid Support Topology for the VSC-HVDC Connected Offshore Wind Farms", IEEE Transactions on Power Delivery, vol. 32, Issue: 3, pp. 1592-1604, Jun. 2017.
(Continued)

*Primary Examiner* — Sean Gugger
(74) *Attorney, Agent, or Firm* — Dority & Manning, P.A.

(57) ABSTRACT

A method for isolating faults in an electrical power system connected to a power grid includes dividing the electrical power system into a plurality of power modules each including a plurality of electrical power subsystems and a substation. Each of the electrical power subsystems defines a stator power path and a converter power path for providing power to the power grid and having a partial power transformer. The method also includes coupling each of the power modules to the power grid via a primary electrical line. Further, the method includes monitoring the electrical power system for faults. In response to detecting a fault in one of the power modules, the method includes isolating the fault to the power module experiencing the fault. In contrast, if the fault is detected in the primary electrical line or the power grid, the method includes tripping the electrical power system.

19 Claims, 10 Drawing Sheets

(51) Int. Cl.
    *H02P 9/00*     (2006.01)
    *H02J 3/38*     (2006.01)
    *F03D 9/25*     (2016.01)
    *H02P 29/024*     (2016.01)

(52) U.S. Cl.
    CPC .............. *H02P 9/006* (2013.01); *H02P 9/007* (2013.01); *H02P 29/024* (2013.01)

(56) References Cited

U.S. PATENT DOCUMENTS

| | | | |
|---|---|---|---|
| 8,659,178 | B2 | 2/2014 | Arlaban Gabeiras et al. |
| 9,190,845 | B2 | 11/2015 | Nelson et al. |
| 9,587,626 | B2 | 3/2017 | Sadaba et al. |
| 2004/0010350 | A1 | 1/2004 | Lof et al. |
| 2008/0001408 | A1 | 1/2008 | Liu et al. |
| 2008/0137382 | A1* | 6/2008 | Datta ................. H02M 7/49 363/35 |
| 2008/0284172 | A1* | 11/2008 | Nielsen ............... F03D 7/026 290/44 |
| 2010/0276930 | A1 | 11/2010 | Fortmann |
| 2011/0273129 | A1* | 11/2011 | Coe ................... H02J 7/007 320/101 |
| 2012/0133342 | A1 | 5/2012 | Murata |
| 2013/0002032 | A1 | 1/2013 | Mori et al. |
| 2013/0103801 | A1 | 4/2013 | Hansen et al. |
| 2013/0193766 | A1* | 8/2013 | Irwin ................. H02H 7/268 307/82 |
| 2013/0197704 | A1* | 8/2013 | Pan ..................... H02J 3/36 700/287 |
| 2013/0241201 | A1* | 9/2013 | Fortmann ............ H02J 3/26 290/44 |
| 2013/0271879 | A1* | 10/2013 | Andersen ............ B63J 3/00 361/20 |
| 2014/0063669 | A1* | 3/2014 | Lundgvist ........... H02H 3/283 361/79 |
| 2014/0092650 | A1* | 4/2014 | Alston .................. H02J 3/36 363/35 |
| 2015/0188468 | A1* | 7/2015 | Xu ...................... H02P 9/007 290/44 |
| 2015/0200543 | A1* | 7/2015 | Nielsen ............... F03D 7/048 307/87 |
| 2015/0249414 | A1* | 9/2015 | Barker ................. H02P 9/007 290/44 |
| 2015/0260162 | A1 | 9/2015 | Pan et al. |
| 2015/0369217 | A1* | 12/2015 | Gupta ................. H02J 3/16 290/44 |
| 2016/0245259 | A1* | 8/2016 | Gupta ................. F03D 7/0284 |
| 2016/0308369 | A1* | 10/2016 | Gupta ................. H02J 3/16 |
| 2016/0333856 | A1* | 11/2016 | Zabalza ............... H02H 7/06 |
| 2017/0122291 | A1* | 5/2017 | Barker ................. F03D 7/043 |
| 2017/0126008 | A1* | 5/2017 | Shen .................. H02J 3/36 |
| 2017/0126010 | A1* | 5/2017 | Canales .............. H02M 3/28 |
| 2017/0302189 | A1* | 10/2017 | Jakob ................. H02J 3/36 |
| 2018/0034264 | A1* | 2/2018 | Wagoner ............. H02H 7/067 |
| 2018/0115163 | A1* | 4/2018 | Nielsen ............... H02J 3/36 |
| 2018/0294650 | A1* | 10/2018 | Shukla ............... H02J 3/386 |
| 2018/0302011 | A1* | 10/2018 | Ganireddy .......... H02P 9/007 |

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

International Search Report, dated Mar. 7, 2019 for PCT Application No. PCT/US2018/059163.

* cited by examiner

SYSTEMS AND METHODS FOR ISOLATING FAULTS IN ELECTRICAL POWER SYSTEMS CONNECTED TO A POWER GRID

FIELD

The present disclosure relates generally to wind farms containing a plurality of wind turbines connected to a power grid, and more particularly to systems and methods for isolating faults in a cluster of wind turbines of the wind farm such that remaining wind turbines can continue to generate power.

BACKGROUND

Wind power is considered one of the cleanest, most environmentally friendly energy sources presently available, and wind turbines have gained increased attention in this regard. A modem wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

The illustrated three-winding transformer 34 typically has (1) a 33 kilovolt (kV) primary winding 33 connected to the power grid, (2) a 6 to 13.8 kV medium voltage (MV) secondary winding 35 connected to the generator stator 32, and (3) a 690 to 900 volt (V) low-voltage (LV) tertiary winding 37 connected to the line-side power converter 42.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

Referring now to FIG. 4, a conventional wind farm with a plurality of wind turbines having a step-up transformer, a medium-voltage collection system, and grid connecting substation is illustrated. In such systems, any fault in the substation or the overhead line trips the entire wind farm and restricts the power flow into the grid, thereby resulting in loss of energy production.

Thus, it would be advantageous to provide a wind farm having a plurality of wind turbines that addresses the aforementioned issues.

BRIEF DESCRIPTION

Aspects and advantages of the invention will be set forth in part in the following description, or may be obvious from the description, or may be learned through practice of the invention.

In one aspect, the present subject matter is directed to a method for isolating faults in an electrical power system connected to a power grid. The method includes dividing the electrical power system into a plurality of power modules. Each of the power modules includes a plurality of electrical power subsystems and a substation for coupling the plurality of electrical power subsystems to the power grid. Further, each of the electrical power subsystems defines a stator power path and a converter power path for providing power to the power grid. The converter power path has a partial power transformer. The method also includes coupling each of the power modules to the power grid via a primary electrical line. Further, the method includes monitoring the electrical power system for faults. In response to detecting a fault in one of the power modules, the method includes isolating the fault to the power module experiencing the fault. In contrast, if the fault is detected in the primary electrical line or the power grid, the method includes tripping the electrical power system.

In another aspect, the present subject matter is directed to an electrical power system connected to a power grid. The electrical power system includes a plurality of power modules. Each of the power modules is coupled to the power grid via a primary electrical line. Further, each of the power modules includes a plurality of electrical power subsystems each defining a stator power path and a converter power path for providing power to the power grid. The converter power path includes a partial power transformer. Each of the power modules also includes a substation coupling the plurality of electrical power subsystems to the power grid. The electrical power system also includes one or more sensors for monitoring the electrical power system for faults. In addition, the electrical power system includes a controller configured to perform one or more operations, including but not limited to in response to detecting a fault in one of the power modules, isolating the fault to the power module experiencing the fault, and in response to detecting a fault in the primary electrical line or the power grid, tripping the electrical power system.

In yet another aspect, the present subject matter is directed to a wind farm connected to a power grid. The wind farm includes a plurality of wind power modules. Each of the wind power modules is coupled to the power grid via a primary electrical line. Further, each of the wind power modules includes a plurality of wind turbines each defining a stator power path and a converter power path for providing power to the power grid. Further, the converter power path includes a partial power transformer. Each of the wind power modules also includes a substation coupling the plurality of wind turbines to the power grid. Further, the wind farm includes one or more sensors for monitoring the wind farm for faults and a controller configured to perform one or more operations, including but not limited to, in response to detecting a fault in one of the wind power modules, isolating the fault to the wind power module experiencing the fault, and in response to detecting a fault in the primary electrical line or the power grid, tripping the wind farm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
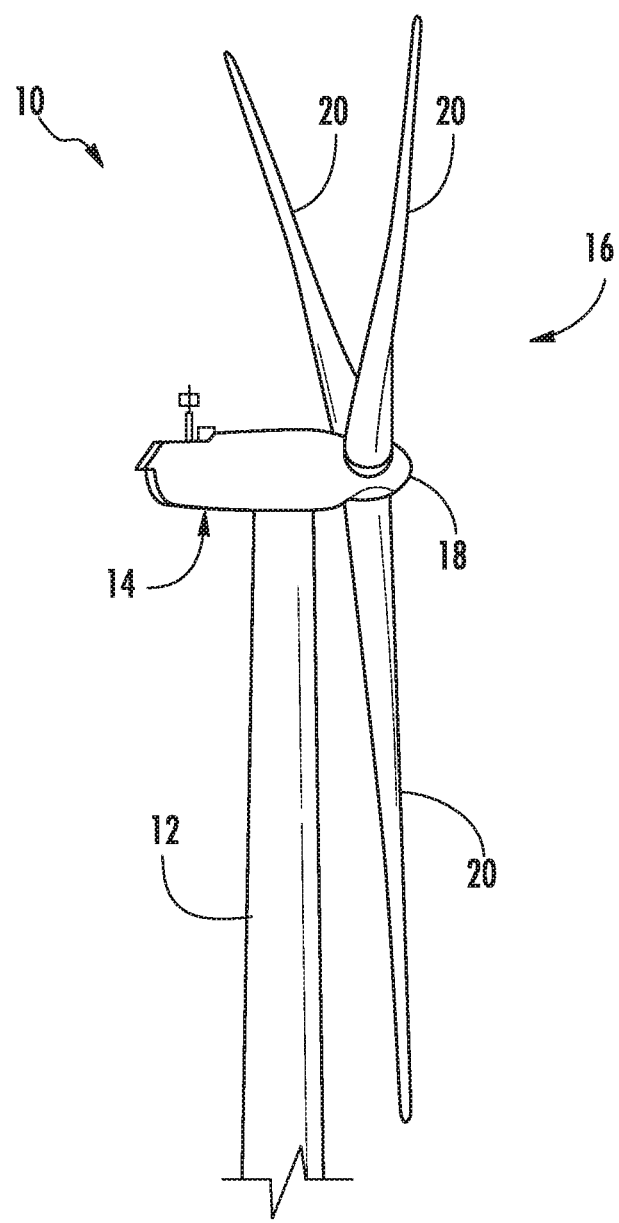
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 5:
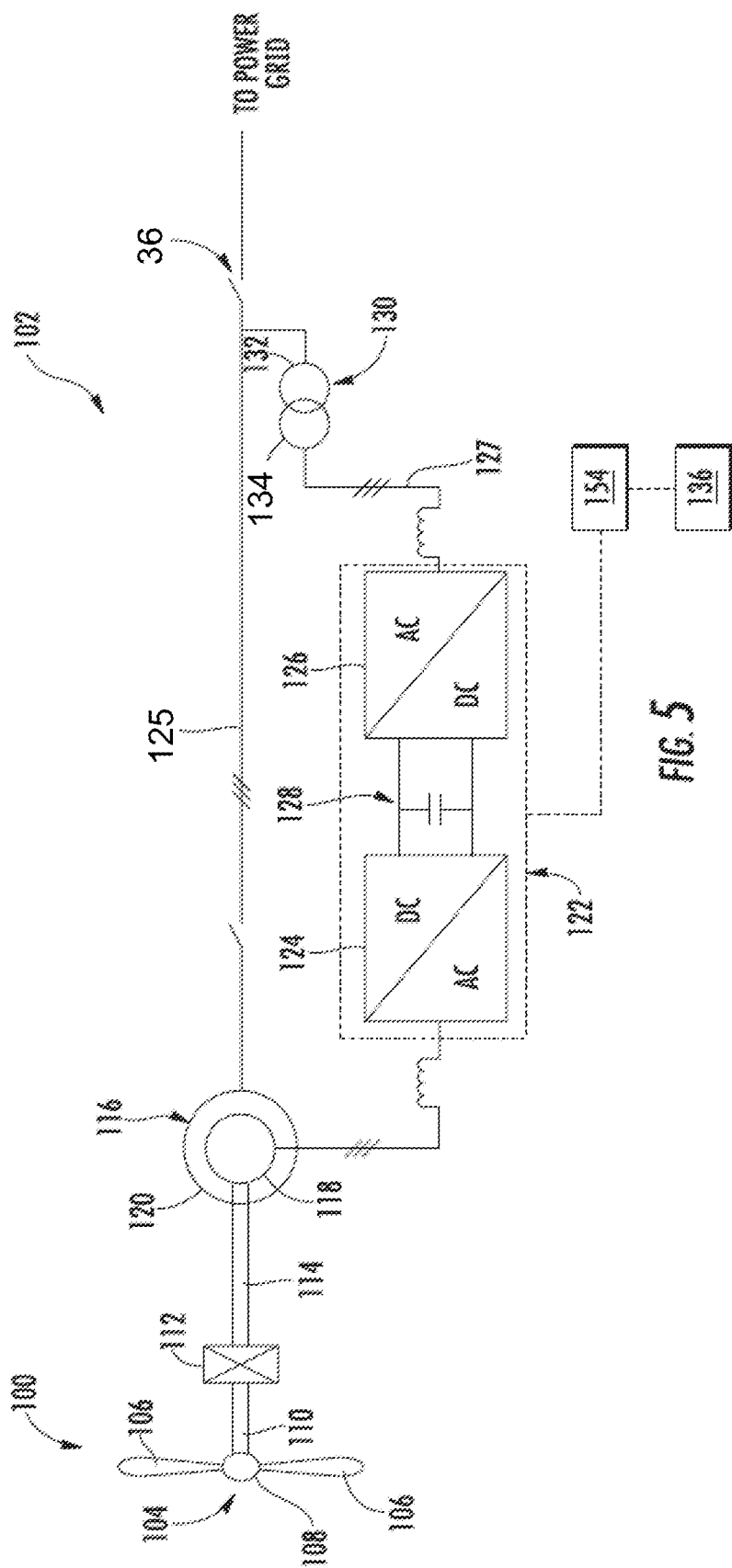
FIG. 5 illustrates a schematic diagram of one embodiment of a wind farm according to the present disclosure, particularly illustrating a plurality of wind turbine clusters each connected to the grid via a cluster transformer.

Referring now to FIG. 5, a schematic diagram of one embodiment of an electrical power subsystem 102 according to the present disclosure is illustrated. It should be understood that the term "subsystem" is used herein to distinguish between the individual power systems (e.g. as shown in FIG. 5) and the overall electrical power system 105 of FIG. 6 that includes a plurality of the electrical power subsystems 102. Those of ordinary skill in the art, however, will recognize that the electrical power subsystem 102 of FIG. 5 may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

Figure 2:
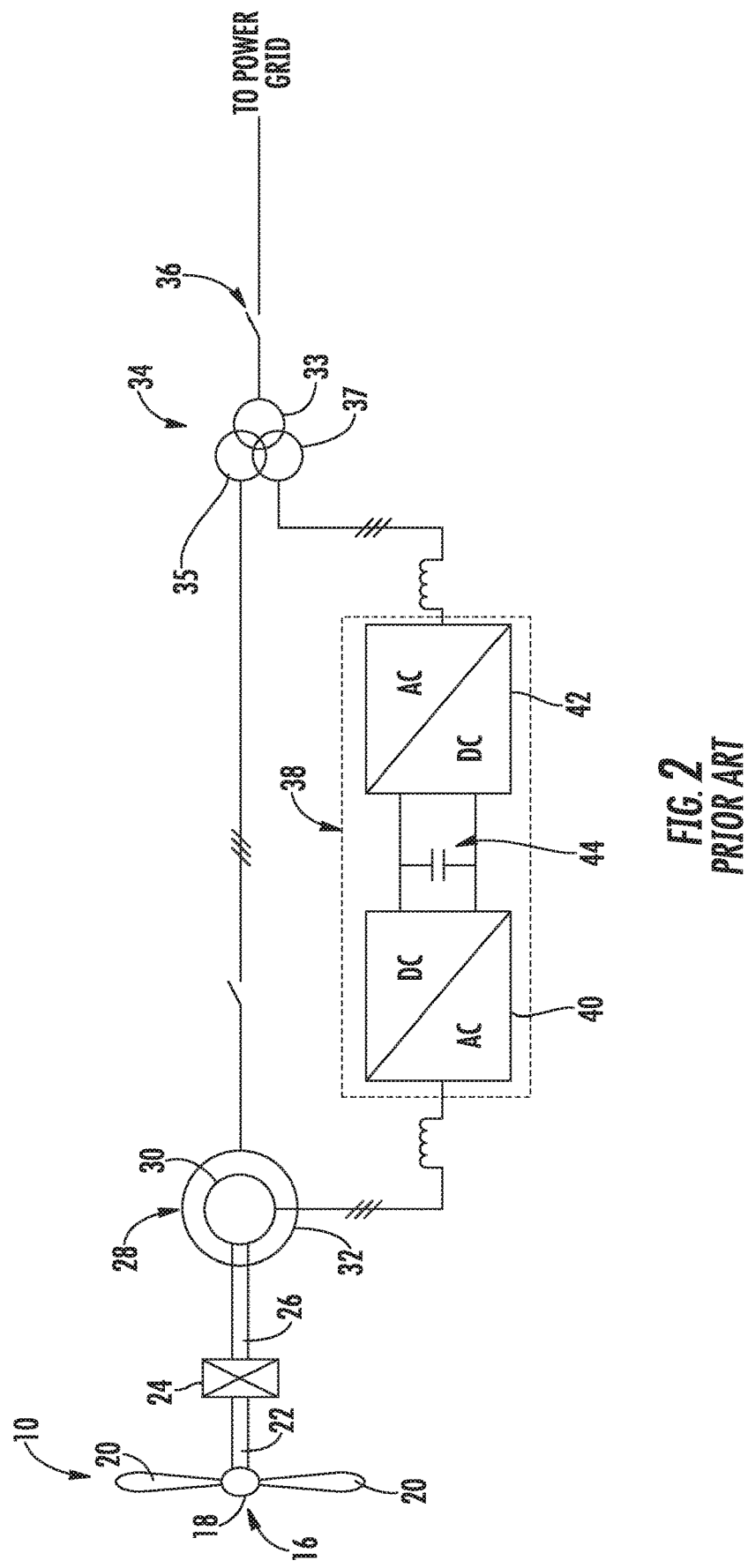
FIG. 2 illustrates a schematic diagram of a conventional electrical power system suitable for use with the wind turbine shown in FIG. 1.
Figure 3:
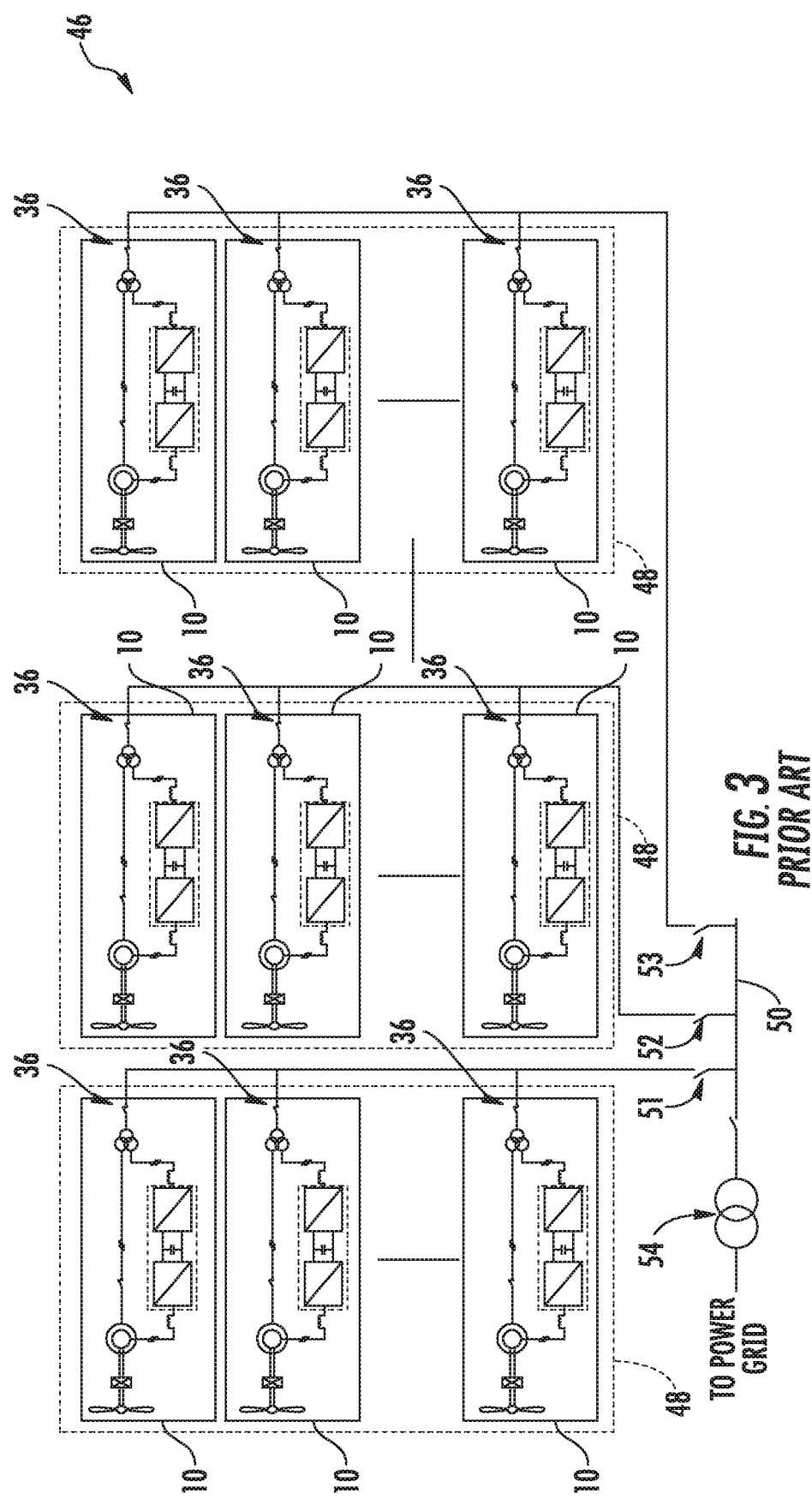
FIG. 3 illustrates a schematic diagram of one embodiment of a conventional wind farm according to conventional construction, particularly illustrating a plurality of wind turbine power systems such as those illustrated in FIG. 2 connected to a single substation transformer.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 5 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the line side converter 126.

Figure 6:
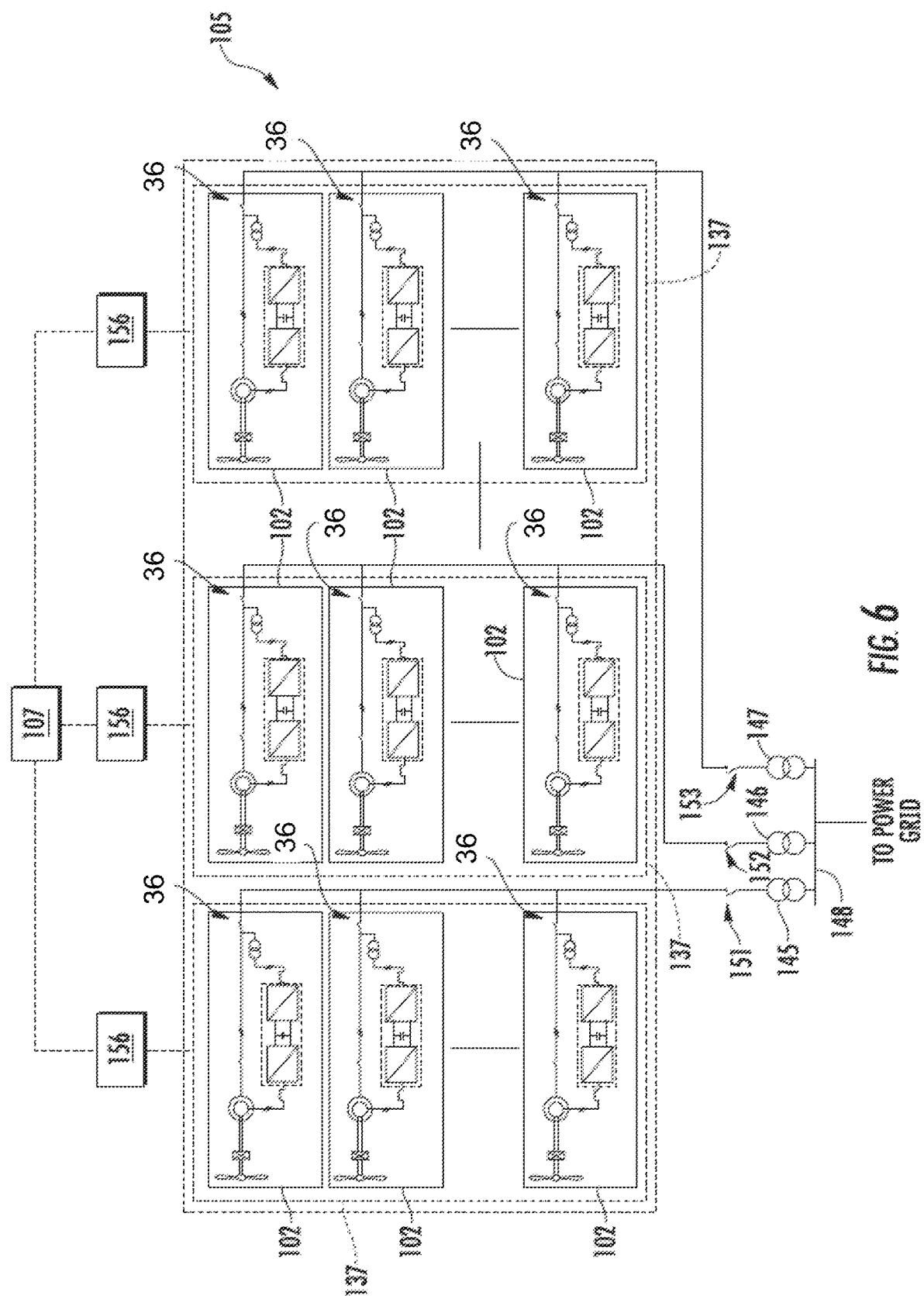
FIG. 6 illustrates a block diagram of one embodiment of a wind turbine controller according to the present disclosure.
Figure 7:
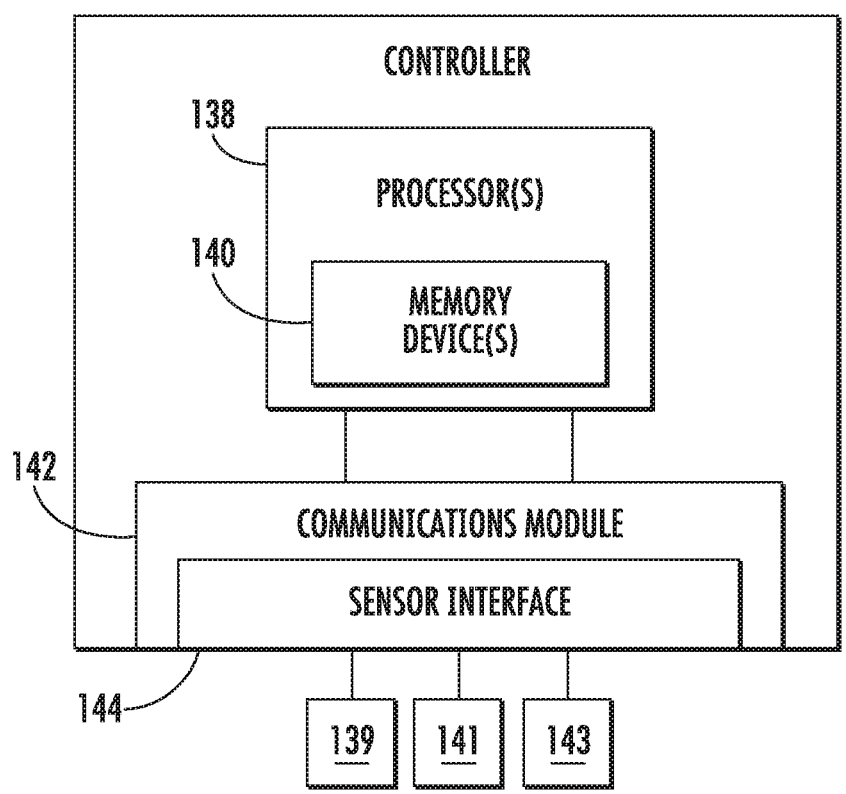
FIG. 7 illustrates a schematic diagram of one embodiment of a wind collector system according to conventional construction.

In addition, the electrical power system 105 may include one or more controllers. For example, as shown in FIGS. 5-7, the electrical power system 105 may include a system-level controller (e.g. a farm-level controller 107), one or more cluster-level controllers 156, and/or one or more subsystem-level controllers (e.g. turbine-level controllers 136). In addition, as shown in FIG. 5, each of the subsystem-level controllers 136 may further communicate with a converter controller 154. As such, the various controllers described herein are configured to control any of the components of the wind farm 105, the wind turbine clusters 137, and/or the individual wind turbines 100 and/or implement the method steps as described herein.

For example, as shown particularly in FIG. 7, a block diagram of one embodiment of a controller as described herein is illustrated. As shown, the controller may include one or more processor(s) 138 and associated memory device(s) 140 configured to perform a variety of computer-implemented functions (e.g., performing the methods, steps, calculations and the like and storing relevant data as disclosed herein). Additionally, the controller may also include a communications module 142 to facilitate communications between the controller and the various components of the wind farm 105, e.g. any of the components of FIGS. 5 and 6. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 7, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 124. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the bus. It should be understood that the rotor side converter 124 and the line side converter 126 may have any configuration using any switching devices that facilitate operation of electrical power system 200 as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Referring back to FIG. 6, individual power systems (such as the power subsystem 102 illustrated in FIG. 4) may be arranged in at least two clusters 137 to form the electrical power system 105 or wind farm. More specifically, as shown, the wind turbine power systems 100 may be arranged into a plurality of clusters 137 so as to form the wind farm 105. Thus, as shown, each cluster 137 may be connected to a separate transformer 145, 146, 147 via switches 150, 151, 152, respectively, for stepping up the voltage amplitude of the electrical power from each cluster 137 such that the transformed electrical power may be further transmitted to the power grid. In addition, as shown, the transformers 145, 146, 147 are connected to a main electrical line 148 (i.e. that can be overhead or underground) that combines the voltage from each cluster 137 before sending the power to the grid. Further, as mentioned, each of the clusters 137 may be communicatively coupled with a cluster-level controller 156.

Figure 4:
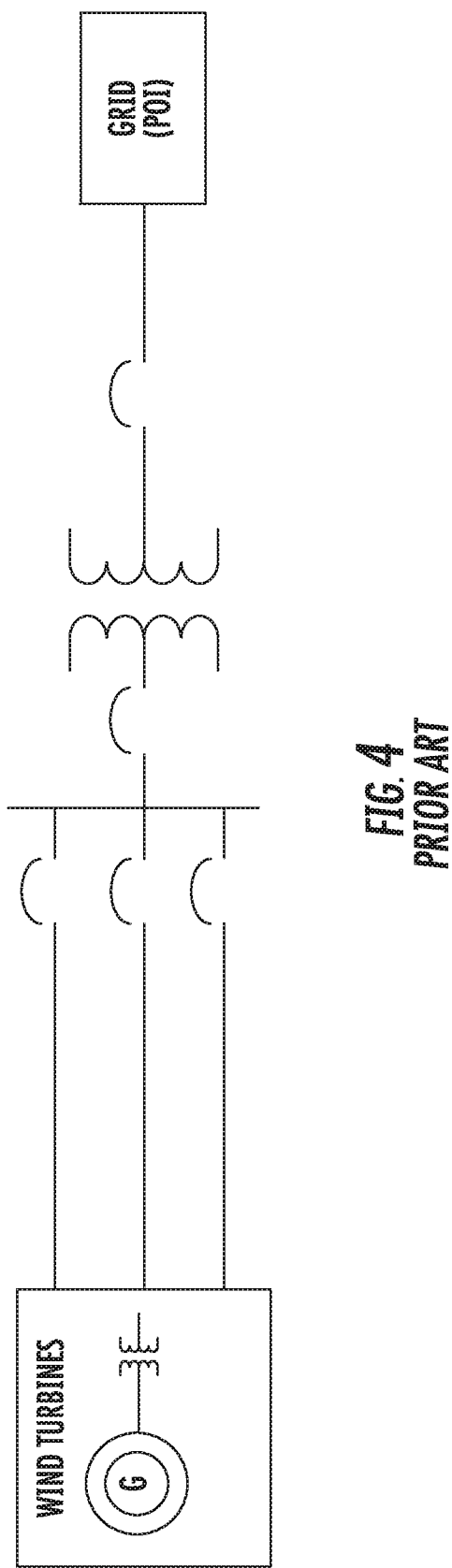
FIG. 4 illustrates a schematic diagram of one embodiment of an electrical power system of a wind turbine according to the present disclosure.
Figure 8:
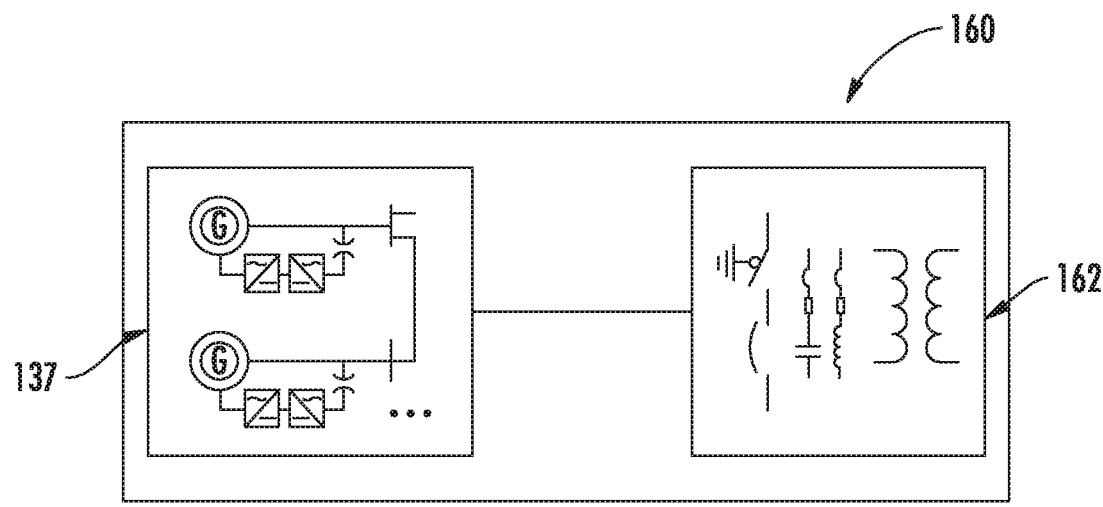
FIG. 8 illustrates a schematic diagram of one embodiment of a wind power module according to the present disclosure.
Figure 9:
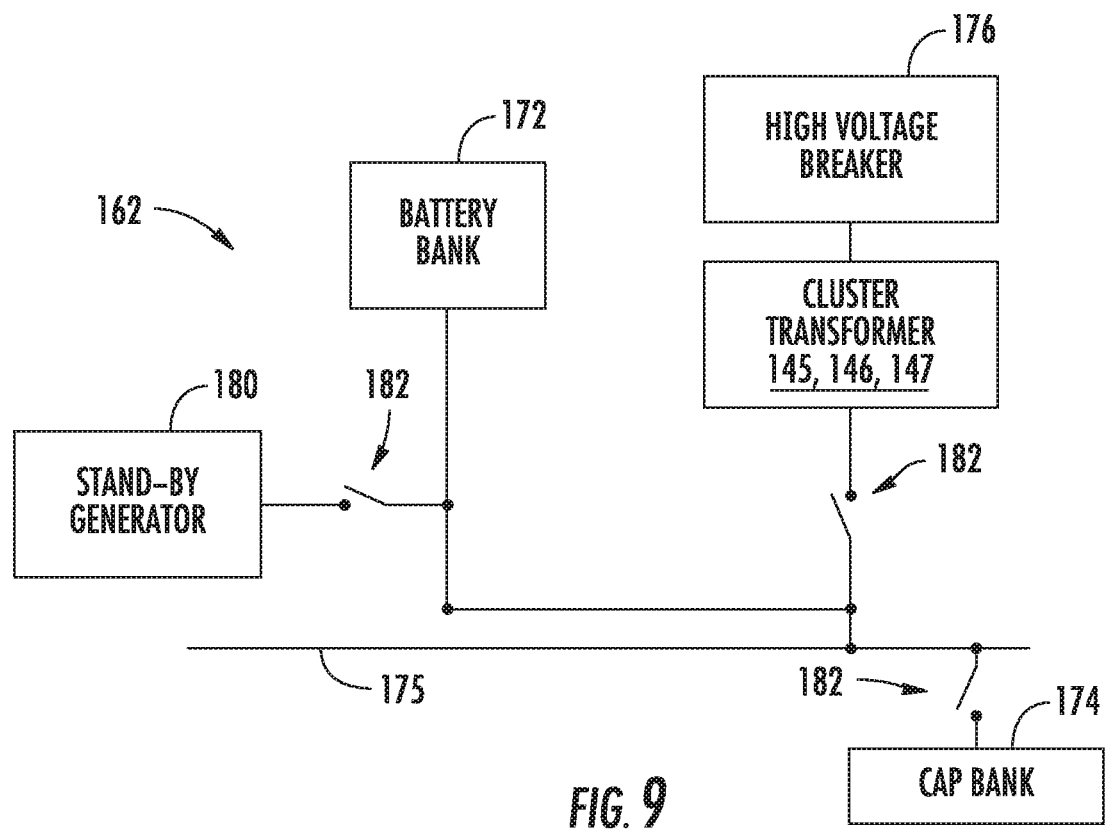
FIG. 9 illustrates a schematic block diagram of one embodiment of a prepackaged substation of a wind power module according to the present disclosure.

As previously mentioned in regard to FIG. 4, conventional wind farms have a step-up transformer, a medium-voltage collection system, and a grid connecting substation. As such, any fault in the substation or the electrical line trips the entire wind farm and restricts the power flow into the grid, thereby resulting in loss of energy production. Accordingly, the present disclosure is directed to a system for addressing the aforementioned issue. For example, as shown in FIG. 8, the wind farm 105 is divided into a wind power modules 160, with each power module 160 including a cluster 137 of wind turbines 100 with at least one transformer-less wind turbine (e.g. such as the wind turbine 11 illustrated in FIG. 5) and a substation 162, such as a prepackaged substation. Alternatively, the substation 162 may also be assembled on site. More specifically, as shown in FIG. 9, the substation 162 may include any one of or a combination of the following substation components: a cluster transformer 145, 146, 147, a medium-voltage bus 175, a battery bank 172 having one or more batteries, a capacitor bank 174, a high voltage breaker 176, a dead-end structure 178, a generator 180, and one or more switches 182 or fuses. Thus, the wind power modules 160 of the wind farm 105 and the interconnections thereof are configured to localize and isolate faults to the respective wind power module where the fault is occurring.

Figure 10:
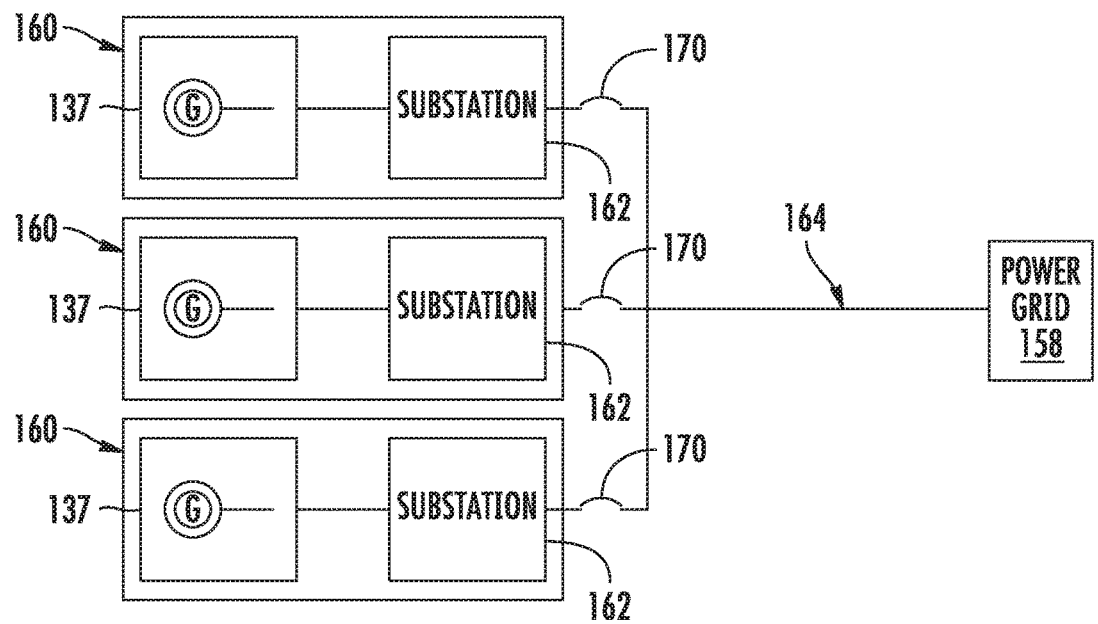
FIG. 10 illustrates a schematic diagram of one embodiment of a plurality of wind power modules having a common electrical line according to the present disclosure.
Figure 11:
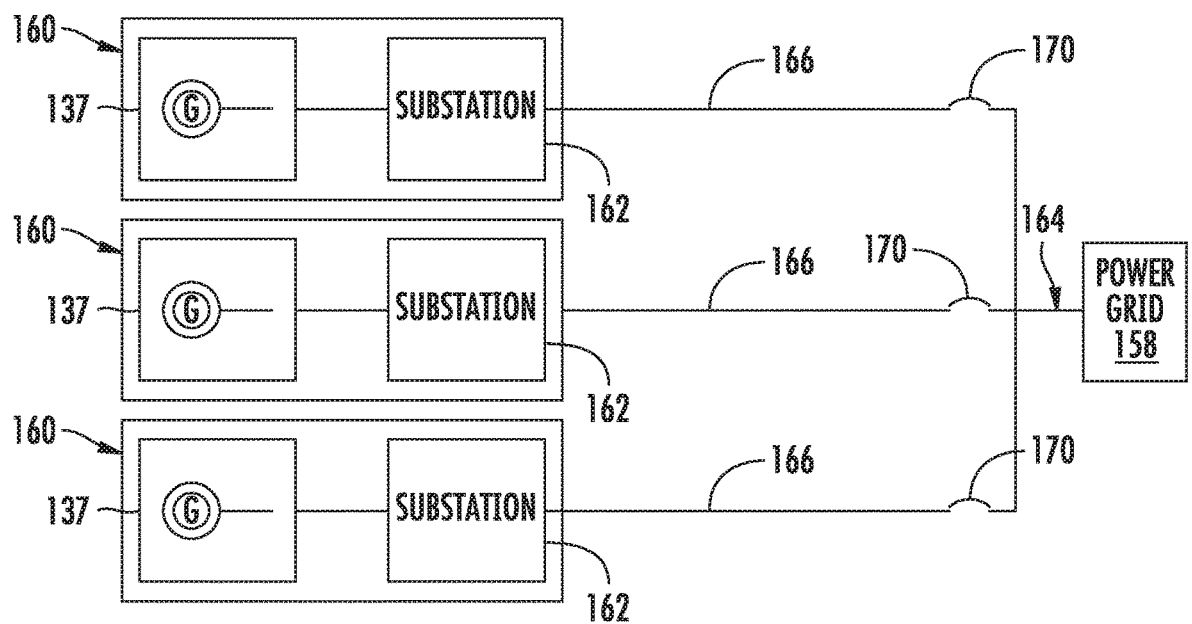
FIG. 11 illustrates a schematic diagram of one embodiment of a plurality of wind power modules having separate electrical line according to the present disclosure.
Figure 12:
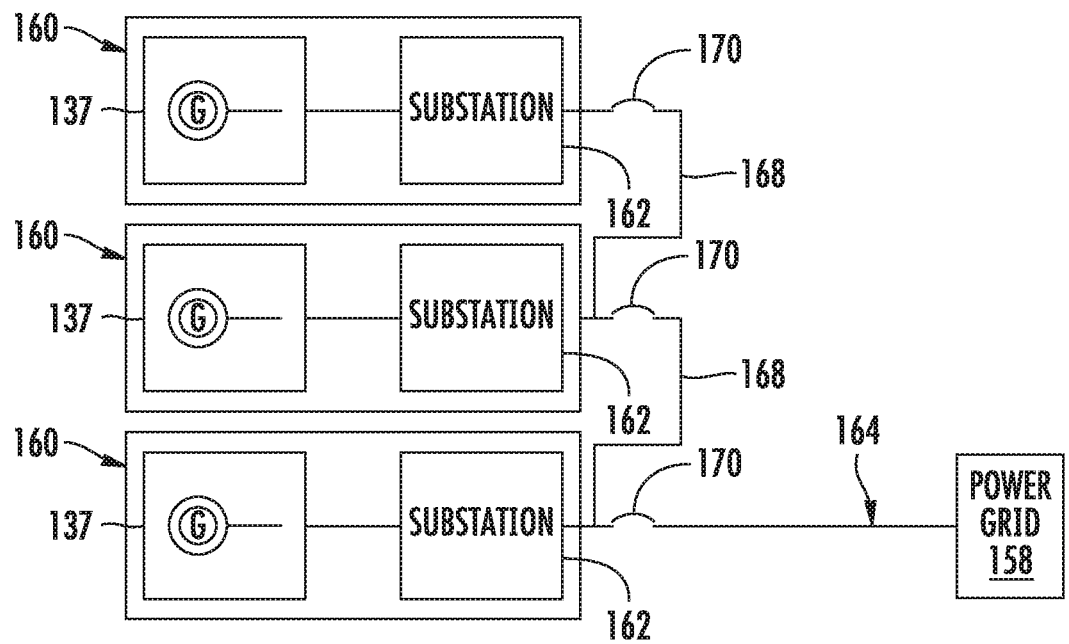
FIG. 12 illustrates a schematic diagram of one embodiment of a plurality of daisy-chained wind power modules with common electrical lines according to the present disclosure.

More specifically, as shown in FIGS. 10-12, different embodiments of the connections between the wind power modules 160 and the power grid 158 are illustrated. As shown, each of the wind power modules 160 are coupled to the power grid 158 via a primary electrical line 164. Further, as shown in FIG. 10, a schematic diagram of one embodiment of a plurality of wind power blocks 160 having a common electrical line (i.e. primary electrical line 164) according to the present disclosure is illustrated. Thus, as shown in the illustrated embodiment, the power modules 160 are coupled directly to the primary electrical line 164 via its respective substation 162.

In another embodiment, FIG. 11 illustrates a schematic diagram of one embodiment of a plurality of wind power blocks 160 having separate electrical lines 166 according to the present disclosure. Thus, as shown in the illustrated embodiment, the substation 162 of each of the power modules 160 is coupled to a separate secondary electrical line 166 and the secondary electrical lines 166 are coupled to the primary electrical line 164. In still another embodiment, FIG. 12 illustrates a schematic diagram of one embodiment of a plurality of daisy-chained wind power blocks 160 with common or shared electrical lines 168 according to the present disclosure. Thus, as shown in the illustrated embodiment, the power modules 160 are coupled together in a sequence via one or more common, secondary electrical lines 168 and the sequence of power modules 160 is coupled to the primary electrical line 164.

Thus, the systems of the present disclosure can easily localize and isolate faults occurring within the wind farm 105. More specifically, any one of the system controllers 107, 136, 154, 156 may be configured to monitor the wind farm 105 for faults, e.g. via the various sensors described herein. In response to detecting a fault in one of the power modules 160, the controller is configured to isolate the fault to the power module 160 experiencing the fault. For example, as shown, in FIG. 10, if the fault is present in any of the substations 162, the controller will localize the fault to a cluster 137 within the associated wind power module 160 experiencing the fault ensuring the availability of the other wind turbine modules 160 for power production. More specifically, in such an embodiment, if the fault is present in any of the substations 162, the controller open a breaker 170 associated with the wind power module 160 experiencing the fault. In contrast, if the fault is detected in the primary electrical line 164 or the power grid 158, the controller will trip the entire wind farm 105.

In another embodiment, as shown in FIG. 11, if the fault is present in any of the separate electrical lines 166, the controller will localize the fault to the associated wind power module 160 experiencing the fault ensuring the availability of the other wind turbine modules 160 for power production. More specifically, as mentioned, if the fault is present in any of the separate electrical lines 166, the controller is configured to open a breaker 170 associated with the wind power module 160 experiencing the fault. In contrast, if the fault is detected in the primary electrical line 164 or the power grid 158, the controller will trip the entire wind farm 105.

In yet another embodiment, as shown in FIG. 12, if the fault is present in the common electrical line 168 connecting the wind power modules 160 together, the controller will localize the fault to the associated wind power module 160 experiencing the fault ensuring the availability of the other wind turbine modules 160 for power production. More specifically, if the fault is present in the common electrical line 168, the controller is configured to open one of the breakers 170 associated with the wind power module 160 experiencing the fault. In contrast, if the fault is detected in the primary electrical line 164 or the power grid 158, the controller will trip the entire wind farm 105.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for isolating faults in an electrical power system connected to a power grid, the method comprising:
    providing a plurality of clusters of electrical power subsystems of the electrical power system and a plurality of prepackaged substations, each of the plurality of prepackaged substations comprising a single cluster transformer, a combination of fuses, buses, breakers, and switches, one or more batteries, and a capacitor bank;

dividing the plurality of clusters of electrical power subsystems into a plurality of power modules, each of the plurality of power modules comprising one of the plurality of clusters of electrical power subsystems and one of the plurality of prepackaged substations to individually and separately couple the respective cluster of electrical power subsystems to the power grid, each of the electrical power subsystems defining a stator power path and a converter power path for providing power to the power grid, the converter power path having a partial power transformer, the stator power path being transformer-less;

coupling each of the plurality of power modules to the power grid via a primary electrical line;

monitoring, via one or more sensors, the electrical power system for faults;

in response to detecting a fault in one of the plurality of power modules, isolating the fault to the power module experiencing the fault; and, in response to detecting a fault in the primary electrical line or the power grid, tripping the electrical power system.

2. The method of claim 1, wherein coupling each of the plurality of power modules to the power grid via the primary electrical line further comprises coupling each of the plurality of power modules directly to the primary electrical line via each of the plurality of power modules' respective prepackaged substation.

3. The method of claim 1, wherein coupling each of the plurality of power modules to the power grid via the primary electrical line further comprises:

coupling the prepackaged substation of each of the plurality of power modules to a secondary electrical line; and, coupling the secondary electrical lines to the primary electrical line.

4. The method of claim 1, wherein coupling each of the plurality of power modules to the power grid via at least one electrical line further comprises:

coupling each of the plurality of power modules together in a sequence via one or more secondary electrical lines; and, connecting the sequence of plurality of power modules to the primary electrical line.

5. The method of claim 4, further comprising, in response to detecting a fault in one of the one or more secondary electrical lines, isolating the fault to the secondary electrical line experiencing the fault.

6. The method of claim 1, wherein isolating the fault to the power module experiencing the fault further comprises opening a breaker of the power module experiencing the fault.

7. The method of claim 1, wherein the each of the plurality of prepackaged substations further comprise at least one of a dead-end structure or a stand-by generator.

8. The method of claim 1, wherein the partial power transformer comprises at least one of a two-winding transformer or a three-winding transformer.

9. The method of claim 1, wherein the electrical power system comprises a wind farm, and wherein the electrical power subsystems comprise wind turbine power systems.

10. An electrical power system connected to a power grid, the electrical power system comprising:

a plurality of power modules, each of the plurality of power modules coupled to the power grid via a primary electrical line, each of the plurality of power modules comprising:

a cluster of electrical power subsystems each defining a stator power path and a converter power path for providing power to the power grid, the converter power path comprising a partial power transformer, the stator power path being transformer-less; and, a prepackaged substation individually and separately coupling the cluster of electrical power subsystems to the power grid, each of the prepackaged substations comprising a single cluster transformer, a combination of fuses, buses, breakers, and switches, one or more batteries, and a capacitor bank;

one or more sensors for monitoring the electrical power system for faults; and, a controller configured to perform one or more operations, the one or more operations comprising:

in response to detecting a fault in one of the plurality of power modules, isolating the fault to the power module experiencing the fault; and, in response to detecting a fault in the primary electrical line or the power grid, tripping the electrical power system.

11. The electrical power system of claim 10, wherein each of the plurality of power modules are directly coupled to the primary electrical line via each of the plurality of power modules' respective prepackaged substation.

12. The electrical power system of claim 10, wherein the prepackaged substation of each of the plurality of power modules is coupled to a secondary electrical line and the secondary electrical lines are coupled to the primary electrical line.

13. The electrical power system of claim 10, wherein each of the plurality of power modules are coupled together in a sequence via one or more secondary electrical lines and the sequence of the plurality of power modules is coupled to the primary electrical line.

14. The electrical power system of claim 13, wherein, in response to detecting a fault in one of the one or more secondary electrical lines, the one or more operations further comprise isolating the fault to the secondary electrical line experiencing the fault.

15. The electrical power system of claim 10, wherein the prepackaged substation of each of the plurality of power modules further comprises at least one of a dead-end structure or a stand-by generator.

16. The electrical power system of claim 10, wherein the partial power transformer comprises at least one of a two-winding transformer or a three-winding transformer.

17. The electrical power system of claim 10, wherein the electrical power system comprises a wind farm, and wherein the electrical power subsystems comprise wind turbine power systems.

18. A wind farm connected to a power grid, comprising:

a plurality of wind power modules, each of the plurality of wind power modules coupled to the power grid via a primary electrical line, each of the plurality of wind power modules comprising:

a cluster of wind turbines each defining a stator power path and a converter power path for providing power to the power grid, the converter power path comprising a partial power transformer, the stator power path being transformer-less; and, a prepackaged substation individually and separately coupling the cluster of wind turbines to the power grid, each of the prepackaged substations comprising a single cluster transformer, a combination of fuses, buses, breakers, and switches, one or more batteries, and a capacitor bank;

one or more sensors for monitoring the wind farm for faults; and, a controller configured to perform one or more operations, the one or more operations comprising:
   in response to detecting a fault in one of the plurality of wind power modules, isolating the fault to the wind power module experiencing the fault; and,
   in response to detecting a fault in the primary electrical line or the power grid, tripping the wind farm.

19. The wind farm of claim 18, wherein the prepackaged substation of each of the plurality of wind power modules further comprises at least one of a dead-end structure or a stand-by generator.

* * * * *